United States Patent Office 3,115,509
Patented Dec. 24, 1963

3,115,509
CHEMICAL PRODUCT AND PROCESS
Gerry P. Mack, Jackson Heights, N.Y., assignor, by mesne assignments, to M & T Chemicals Inc., New York, N.Y., a corporation of Delaware
No Drawing. Filed Oct. 23, 1958, Ser. No. 769,084
12 Claims. (Cl. 260—429.7)

The present invention relates to novel organotin compounds and to resin compositions containing these compounds as stabilizers.

As is well known, vinyl resins degrade when exposed to heat and to light. This degradation becomes apparent by a darkening of the resin. Many materials which will stabilize resins with various degrees of effectiveness are known. The best of these are effective stabilizers against the degradative action of heat. Unfortunately, they are not also very effective against the degradative action of light. I have now discovered a stabilizer which, when incorporated in a resin, stabilizes the resin against the degradative effects of both heat and light.

It is an object of this invention to provide novel stabilizers for halogenated resins.

A further object of this invention is to provide resins stabilized especially to the effects of ultra-violet light.

It is also an object of this invention to provide novel organotin mercapto compounds.

The stabilizers of the present invention are novel compounds that may be generally designated as condensation products of organotin compounds with dimercaptoacid esters of organic diols. These condensation products have the general formula $$R_xSn(-S-A-COO-B-OOC-A-SH)_{4-x}$$

wherein $x$ is 1, 2, or 3, R is a univalent organic radical and preferably a hydrocarbon radical such as an alkyl, aryl, aralkyl or alkaryl radical containing up to 10 carbon atoms, A is a hydrocarbon group preferably having no more than 20 carbon atoms and generally not more than 6 carbon atoms, B is a hydrocarbon radical preferably having no more than 20 carbon atoms, and wherein the sum of the carbon atoms of A and B is preferably no more than 25.

It has been found that these novel products may be prepared by reacting an organotin compound with a dimercaptoacid ester of an organic diol of the following general formula:

$$HS-A-COO-B-OOC-A-SH$$

wherein A and B have the definitions specified hereinbefore.

The reaction for the formation of these organotin bis dimercapto derivatives may be illustrated, using an organotin oxide, by the following equation:

$$R_2SnO + 2HS-A-COO-B-OOC-A-SH$$
$$\rightarrow R_2Sn(-S-A-COO-B-OOC-A-SH)_2 + H_2O$$

The equation illustrates the necessity of using two molecules of the dimercaptoacid ester per molecule of the organotin oxide in order to obtain the desired product having two free mercapto groups. When mono- or tri-organotin compounds are used as reactants, the molar ratio of organotin compound to dimercaptoacid ester is about 1:3 and 1:1, respectively, so that the condensation products contain three and one free mercapto groups, respectively. For purpose of convenience, the amount of dimercaptoacid ester to be reacted with the organotin compound will be designated as the equivalent amount. More specifically, the equivalent amount thereof (on a molar basis) per mole of the $R_xSn$ compound will be 1 mole when the latter compound is an $R_3Sn$ compound e.g. $R_3SnCl$, 2 moles when the latter compound is an $R_2Sn$ compound e.g. $R_2SnO$, and 3 moles when the latter compound is an RSn compound e.g. $RSnCl_3$. It is surprising in all these condensation reactions that very little of the expected polymeric-type products is formed.

The organotin compound that is condensed with the dimercaptoacid ester to produce the desired products is, more specifically, selected from the class consisting of organotin halides, hydroxides, oxides, and stannoic acids wherein the organo groups are preferably alkyl, aryl, aralkyl, or alkaryl radicals containing up to 10 carbon atoms. When an organotin halide having the formula $RSnX_3$, $R_2SnX_2$, or $R_3SnX$, wherein X is a halogen atom such as chlorine, is employed as the reactant, the reaction which the dimercaptoacid ester is accomplished in the presence of basic substances or alkaline neutralizing agents (hydrogen ion acceptors) such as oxides, hydroxides (e.g., sodium hydroxide) carbonates (e.g., sodium and potassium carbonate) ammonia, amines (e.g., pyridine) etc.

As examples of the preferred diols which may be conveniently used in the reactions are the following hydrocarbon diols and equivalent acting materials such as the glycol ethers: ethylene glycol, diethylene glycol, triethylene glycol, propylene glycol, dipropylene glycol, 2-ethyl-2-butyl-1,3-propanediol, 2,2-diethyl-1,3-propanediol, 2-ethyl-1,3-hexanediol, hexylene glycol, 1,5-pentanediol, 12-hydroxystearyl alcohol, 1-10-dodecanediol. Thus, the term "hydrocarbon" used to describe "B" in the general chemical formula herein includes all radicals of the type illustrated above.

As examples of the mercaptoacid which may be used in forming the above compounds are the following: mercaptoacetic acid, β-mercaptopropionic acid, thiosalicylic acid, α-mercaptopropionic acid, valeric acid, α-mercaptocaproic acid, α-mercaptocaprylic acid, α-mercaptopelargonic acid, α-mercaptolauric acid, α-mercaptopalmitic acid, α-mercaptostearic acid, α-mercaptophenylacetic acid, α-mercaptodiphenylacetic acid, α-mercaptodiethylacetic acid, 5-mercaptovaleric acid, 6-mercaptocaproic acid, 8-mercaptocaprylic acid, 12-mercaptolauric acid.

In the preparation of the organotin derivatives any suitable reaction temperatures may be employed. It is ordinarily preferred to use room temptrature or slightly elevated temperatures of up to about 50° C. at the beginning of the reaction. Since the organotin compounds and the alpha and beta mercaptoacid esters react exothermically, as the reaction proceeds the temperature may increase as much as 20° to 50° C. Thus, for example, the initial reaction temperature may be within the broad range of 20° to 50° C. and the final temperature may be within the broad range of 40° to 100° C. The presence of water produced by the condenastion reaction usually requires an additional heating or refluxing period, however, in order to strip the water from the reaction product, though it may be removed in any suitable manner. An inert atmosphere is preferably maintained during the synthesis.

Inert organic solvents such as benzene, toluene, methyl alcohol, etc., may be used as the medium for the reaction. The presence of such a solvent facilitates the desired reaction. The solvent may be removed from the product by any suitable means at the completion of the reaction. This may be accomplished by vaporizing the solvent under vacuum at elevated temperatures. Pressures of about 2 to 30 mm. and temperatures of 75°–160° C. are satisfactory in effecting removal of toluene or like solvents from the reaction product.

By the procedure of this invention these novel organotin derivatives of dimercapto acid esters of organic diols can be obtained in almost theoretical yields. These yields are indicative of the non-necessity of the use of an excess of either reactant, the total amount of starting materials being substantially completely utilized in the formation of the final reaction product. The following are examples of the preparation of the organotin compounds of this invention; however, it is to be understood that the invention is not restricted to the specific embodiments described herein in detail.

EXAMPLE 1

Ethylene Glycol Dimercaptoacetate

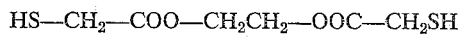

Two moles of mercaptoacetic acid, one mole of ethylene glycol, 2 grams of p-toluene sulphonic acid (esterification catalyst), and 100 ml. of toluene were placed in a glass reaction vessel. The mixture was refluxed with stirring to remove the water of reaction. In eight hours the theoretical amount of water was extracted. The toluene was then stripped off at about 10 mm. pressure, and the product then distilled.

In a similar manner, ethylene glycol di-12-mercaptolaurate was prepared from ethylene glycol and 12-mercaptolauric acid; propylene glycol di-β-mercaptobutyrate from propylene glycol and β-mercaptobutyric acid; ethylene glycol di-5-mercaptovalerate from ethylene glycol and 5-mercaptovaleric acid; and 2-ethyl-2-butyl-1,3-propanediol di-thiosalicylate from 2-ethyl-2-butyl-1,3-propanediol and thiosalicylic acid. 12-hydroxystearyl alcohol dimercaptoacetate, assaying 85% mercaptosulfur, was prepared also from 12-hydroxystearyl alcohol and mercaptoacetic acid; however, purification by distillation was impractical because of the high boiling point. This product was dissolved in toluene and then reacted directly with dibutyltin oxide to form the desired final product.

EXAMPLE 2

Two moles of ethylene glycol dimercaptoacetate was added to a stirred slurry of 1 mole of dibutyltin oxide in 350 cc. of toluene. An exothermic reaction in which the temperature rose from room temperature to 40° C. ensued. The slurry became slightly turbid in contrast with the initial opaque appearance. The temperature was then raised to the reflux temperature of toluene. Water was removed from the reaction product by collecting it in a moisture trap. Then the toluene was removed by vacuum distillation and the product isolated.

EXAMPLE 3

One mole of diethylene glycol di-5-mercaptovalerate, 1 mole of tributyltin monochloride, and 100 ml. of toluene were charged in the flask. To this flask was added gradually 100% excess of sodium carbonate. On adding the sodium carbonate, the temperature rose. Heat was then applied. The reaction was completed in about six hours as evidenced by the removal of water and carbon dioxide from the reaction. The salt residue was filtered and the material was stripped of toluene by vacuum distillation to a pot temperature of 125° C. at 2 mm. pressure. The product was a yellow colored liquid.

EXAMPLE 4

Following the procedure of Example 3, trioctyltin monochloride reacts with diethylene glycol di-5-mercaptovalerate to obtain trioctyltin diethylene glycol di-5-mercaptovalerate.

EXAMPLE 5

Ethylene glycol dimercaptoacetate (1 mole) was mixed with triphenyltin chloride (1 mole) and 55 ml. of toluene. To this mixture was added slowly sodium carbonate. Addition of the carbonate and removal of water reaction was completed in three and one-third hours. The material was then filtered by gravity and the toluene was stripped to a pot temperature of about 150° C. at 2 mm. pressure. The product was a light colored viscous liquid.

EXAMPLE 6

Ethylene glycol demarcaptoacetate (0.5 mole) is mixed with 0.5 mole tribenzyltin chloride and 50 ml. of toluene. Sodium carbonate is slowly added to this mixture, and water of reaction is removed. The reaction product is filtered and the toluene stripped off to a pot temperature of about 150° C. at 2 mm. pressure to obtain tribenzyltin ethylene glycol dimercaptoacetate.

EXAMPLE 7

One mole of dibutyltin dichloride was dissolved in two moles of 1,4-butylene glycol dimercaptoacetate. An excess (about 50 liters) of anhydrous ammonia was bubbled into the solution at a rate of 550 cc./min. for about one and one-half hours. The exothermic reaction which ensued raised the reaction temperature to about 80–100° C. When the reaction temperature began to drop, indicating completion of the reaction, nitrogen was bubbled through the mixture to dispel any gross excess of ammonia. The reaction mixture was then washed with sufficient 5% citric acid to neutralize the remaining free ammonia, the organic layer separated and heated to 126° C. to remove residual water. In this manner, dibutyltin bis (1,4-butylene glycol dimercaptoacetate) was obtained.

EXAMPLE 8

Following the procedure of Example 7, dioctyl tin dichloride reacts with 1,4-butylene glycol dimercaptoacetate to obtain dioctyltin bis (1,4-butylene glycol dimercaptoacetate).

EXAMPLE 9

To 155.1 g. of 1,5-pentanediol dimercaptoacetate was added 19.1 g. of dibutyltin dichloride. The mixture was heated to about 35° C. and anhydrous ammonia slowly added below the surface. The exothermic reaction carried the temperature to about 80° C. in about 45 minutes. As the temperature dropped back to 50° C. the flow of ammonia was stopped and nitrogen was bubbled through the reaction mixture to remove excess ammonia. Then the reaction mixture was washed with 200 cc. of 2.5% citric acid solution to neutralize any residual ammonia. The organic layer was separated, and heated to 120° C. to drive off water. The remaining product was filtered to obtain the desired product, a water-white liquid.

EXAMPLE 10

Following the procedure of Example 6, dibutyltin dichloride reacted with 1,8-octanediol dimercaptoacetate to obtain dibutyltin bis 1,8-octanedioldimercaptoacetate.

EXAMPLE 11

Dibutyltin dichloride (91.1 g., 0.3 mole) and 193.8 g. (0.3 mole plus 9% excess) of 1-ethyl-1,3-hexanedioldimercaptoacetate were mixed and heated to 35° C. Anhydrous ammonia was bubbled through the stirred reaction mixture. The temperature rose to 73° C. After excess ammonia was removed by bubbling nitrogen through the mixture, 200 cc. of 5% citric acid solution was added and the mixture thoroughly stirred. The organic layer was separated and heated to 120° C. to drive off water. The product was then filtered.

EXAMPLE 12

Di(ethylhexyl)tin dichloride (0.5 mole) is added to 1.0 mole of ethylene glycol dimercaptoacetate and anhydrous ammonia is bubbled through the reaction mixture at 35° C. The reaction temperature increases as the reaction proceeds. When the temperature begins to fall, nitrogen is bubbled through the mixture to dispel excess ammonia. The reaction mixture is washed with 5% citric acid solution, and the organic layer separated and heated to 120° C. to remove water. The product is then filtered.

EXAMPLE 13

Butyltin trichloride (0.5 mole) is added to 446 g. (1.5 moles plus 6% excess) of propylene glycol di-β-mercaptobutyrate and a mixture is heated to 35° C. Anhydrous ammonia is slowly added until the exothermic reaction subsides. Excess ammonia is removed by bubbling nitrogen through the reaction mixture, and the mixture then washed with sufficient 5% citric acid solution to neutralize any remaining free ammonia. The organic layer is separated and heated to 125° C. to remove water. The product is then filtered to obtain butyltin S,S',S"(propylene glycol di-β-mercaptobutyrate).

The novel organotin derivatives hereinabove described function as excellent stabilizers for halogen-containing resin compositions, particularly vinyl halide resin compositions. They also function to plasticize the resin. Lesser amounts of the usual plasticizer are necessary when these stabilizers are used. An additional important feature of the use of these organotin compounds is that resins stabilized with them have surprisingly increased light stability in addition to heat stability. By the use of these stabilizers, an effective light as well as heat stabilized resin is obtained. The organotin stabilizers in the prior art containing an organic group attached to the tin through a sulfur linkage exhibit heat stability but they do not exhibit the light stability of the organotin compounds described in this invention. Excellent films are obtained from the aforesaid plastic compositions which exhibit the high degree of heat and light stability. The concentration of these novel organotin derivatives generally used in stabilizing resins against the adverse effects of heat and light is between 0.5 and 10%, based on the weight of the vinyl resins. In plasticized vinyl resins, concentrations of between 1% and 3% of the organotin compound are preferably used. Resin compositions containing these concentrations of stabilizer produce stable and clear plastic films which remain clear at elevated temperatures and for long periods of time when exposed to light, including those wavelengths in the ultraviolet region.

As many embodiments of this invention may be made without departing from the spirit and scope thereof, it is to be understood that the invention includes all such modifications and variations as come within the scope of the appended claims.

I claim:
1. A compound having the formula

$$R_xSn(S-A-COO-B-OOC-A-SH)_{4-x}$$

wherein $x$ is an integer from 1 to 3, R is a hydrocarbon group of up to 10 carbon atoms, A and B are hydrocarbon radicals having up to 20 carbon atoms, and wherein the sum of the carbon atoms of A and B does not exceed 25.

2. A compound according to claim 1 in which $x$ is 1.
3. A compound according to claim 1 in which $x$ is 2.
4. A compound according to claim 1 in which $x$ is 3.
5. A compound according to claim 1 in which R is a butyl group.
6. A compound according to claim 1 in which R is an octyl group.
7. A compound according to claim 1 in which R is a phenyl group.
8. Dibutyltin bis S,S'(1,4-butylene glycol dimercaptoacetate).
9. Dibutyltin bis S,S'(1,5-pentanediol dimercaptoacetate).
10. Dibutyltin bis S,S'(1,8-octanediol dimercaptoacetate).
11. Dibutyltin bis S,S'(1, ethyl-1,3-hexanediol dimercaptoacetate).
12. A compound having the formula $$R_xSn(S-A-COO-B-OOC-A-SH)_{4-x}$$

wherein $x$ is an integer from 1 to 3, R is a hydrocarbon group of up to 10 carbon atoms, A is a hydrocarbon radical having up to 6 carbon atoms, B is a hydrocarbon radical having up to 20 carbon atoms, and wherein the sum of the carbon atoms of A and B does not exceed 25.

References Cited in the file of this patent
UNITED STATES PATENTS

| | | |
|---|---|---|
| 2,752,325 | Leistner | June 26, 1956 |
| 2,885,415 | Ramsden | May 5, 1959 |

FOREIGN PATENTS

| | | |
|---|---|---|
| 748,228 | Great Britain | Apr. 25, 1956 |